US007532860B2

(12) United States Patent
Loner

(10) Patent No.: US 7,532,860 B2
(45) Date of Patent: May 12, 2009

(54) METHOD OF USING FEEDBACK FROM CONSUMER TERMINALS TO ADAPTIVELY CONTROL A SATELLITE SYSTEM

(75) Inventor: Patrick J. Loner, Los Angeles, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 865 days.

(21) Appl. No.: 10/947,624

(22) Filed: Sep. 21, 2004

(65) Prior Publication Data

US 2006/0064726 A1  Mar. 23, 2006

(51) Int. Cl.
H04B 7/185 (2006.01)
(52) U.S. Cl. .................. 455/12.1; 342/352; 370/316
(58) Field of Classification Search .............. 455/12.1
See application file for complete search history.

(56) References Cited

U.S. PATENT DOCUMENTS

| | | | |
|---|---|---|---|
| 3,896,382 A | 7/1975 | Magenheim | |
| 4,776,035 A | 10/1988 | Duggan | |
| 4,896,369 A | 1/1990 | Adams, Jr. et al. | |
| 4,941,199 A * | 7/1990 | Saam | 455/10 |
| 5,579,367 A | 11/1996 | Raymond et al. | |
| 5,666,648 A * | 9/1997 | Stuart | 370/321 |
| 5,691,980 A * | 11/1997 | Welles et al. | 370/316 |
| 5,793,813 A * | 8/1998 | Cleave | 375/259 |
| 5,801,754 A | 9/1998 | Ruybal et al. | |
| 5,812,947 A * | 9/1998 | Dent | 455/427 |
| 5,898,680 A * | 4/1999 | Johnstone et al. | 370/316 |
| 5,918,156 A | 6/1999 | Tanabe | |
| 5,949,766 A * | 9/1999 | Ibanez-Meier et al. | 370/316 |
| 5,959,984 A * | 9/1999 | Dent | 370/347 |
| 5,999,127 A * | 12/1999 | Dezelan | 342/359 |
| 6,044,323 A * | 3/2000 | Yee et al. | 701/120 |
| 6,125,261 A * | 9/2000 | Anselmo et al. | 455/12.1 |
| 6,141,534 A * | 10/2000 | Snell et al. | 455/12.1 |
| 6,151,308 A * | 11/2000 | Ibanez-Meier et al. | 370/316 |
| 6,212,360 B1 * | 4/2001 | Fleming et al. | 455/13.4 |
| 6,272,340 B1 | 8/2001 | Wright et al. | |
| 6,324,381 B1 * | 11/2001 | Anselmo et al. | 455/12.1 |
| 6,647,270 B1 * | 11/2003 | Himmelstein | 455/456.1 |
| 6,763,006 B1 * | 7/2004 | Lockett | 370/318 |
| 6,975,582 B1 * | 12/2005 | Karabinis et al. | 370/204 |
| 6,990,314 B1 * | 1/2006 | Hagen et al. | 455/13.1 |
| 7,043,200 B2 * | 5/2006 | Andenæs | 455/13.4 |
| 7,047,029 B1 * | 5/2006 | Godwin et al. | 455/505 |
| 7,408,892 B2 * | 8/2008 | Dale et al. | 370/316 |
| 2003/0203733 A1 * | 10/2003 | Sharon | 455/427 |
| 2005/0020204 A1 * | 1/2005 | Ducasse | 455/12.1 |
| 2005/0037706 A1 * | 2/2005 | Settle | 455/12.1 |
| 2008/0088462 A1 * | 4/2008 | Breed | 340/573.1 |

\* cited by examiner

Primary Examiner—Duc Nguyen
Assistant Examiner—Hai V Nguyen

(57) ABSTRACT

A system and a methodology uses data provided from consumer terminals in a satellite system to reconfigure a satellite to thereby optimize the strength of signals transmitted by the satellite. The data from the consumer terminals may be used to provide diagnostic information about the reception of signals at various points in an area covered by a satellite broadcasting system and to compensate for attenuation of signals transmitted by the satellite due to weather storms, or other atmospheric conditions. Such use of consumer terminals eliminates the need to place expensive monitoring stations throughout an area covered by a satellite broadcasting system, resulting in substantial reduction in overall system cost. Additionally, given the widespread distribution of consumer terminals, greater monitoring coverage is achieved than with a limited number of monitoring stations.

16 Claims, 6 Drawing Sheets

METHOD OF USING FEEDBACK FROM CONSUMER TERMINALS TO ADAPTIVELY CONTROL A SATELLITE SYSTEM

TECHNICAL FIELD

The present patent relates generally to satellite systems, and more particularly, to adaptive satellite control systems.

BACKGROUND ART

Modern day satellite systems are used in a variety of applications, including providing commercial communication networks, defense related applications, mass broadcasting of television programs, etc. In one application, a system of satellites provides television programs to a number of consumers by broadcasting television programs over a wide geographic area. Each of the satellites in such a system may be responsible for broadcasting television programming signals over a specified geographical area.

In such television broadcasting systems, signals transmitted by a broadcasting satellite are received by a number of consumer terminals dispersed over a wide geographical area. To get proper information from the signals received by any of the number of consumer terminals, it is important that the satellite signal received by the consumer terminal is of proper strength. The strength of satellite signals traveling in the atmosphere between a satellite and a consumer terminal gets affected by a variety of factors, some of which are related to the weather conditions prevalent in the atmosphere. For example, high moisture content in the atmosphere results in higher degradation of satellite signals passing through such atmosphere. Similarly, certain weather patterns, such as storms may generate magnetic charges in the upper atmosphere, and the strength of satellite signals passing through such storms may become adversely affected.

To ensure that most of the consumer terminals receive satellite signals at a strength above a minimum acceptable level, a broadcasting satellite must account for potential signal degradations. However, because most broadcasting satellites have limited power available to transmit satellite signals, it is not advantageous for an operator of a satellite broadcasting system to broadcast satellite signals of strengths much higher than the threshold level necessary to provide the proper signal strength at a majority of consumer terminals in the given area. However, when a satellite is broadcasting satellite signals in an area at a strength level not significantly above this threshold level, signal degradations due to the presence of adverse atmospheric conditions in that area may cause the satellite signals to drop below the minimum threshold level in that area. This results in a consumer not being able to obtain sufficient useful information from the satellite signals. As such, it is important that the broadcasting satellite has some information about the atmospheric conditions and their effect on the satellite signals transmitted in a given area, and/or about the actual strength of the satellite signals received at various consumer terminals.

One way to address this problem is by using a system of ground based weather radar stations to detect the presence of weather conditions which may attenuate the strength of signals transmitted by broadcasting satellites in a given area. This approach relies upon the use of ground based radars to detect or predict storm fronts or other inclement weather conditions and to provide this information to a broadcasting satellite. Using this information, the broadcasting satellite may compensate for the anticipated attenuation of satellite signals due to rain or other conditions of a storm, or the satellite may broadcast satellite signals of higher signal strength in an area where such inclement weather is expected. One of the disadvantages of this approach is that it fails to provide non-weather related signal degradation and interference information. Secondly, this approach relies upon weather radar stations throughout an area of interest, which may not be a possibility in all areas covered by a satellite broadcasting system. Thirdly, such a system requires a number of weather radar stations and a satellite system control center to be communicatively linked to each other throughout a desired coverage area. Installation and maintenance of such communication links may be expensive.

BRIEF DESCRIPTION OF THE DRAWINGS

The present patent is illustrated by way of example and not limitation in the accompanying figures, in which like references indicate similar elements, and in which.

DESCRIPTION OF THE EMBODIMENTS

Figure 1:
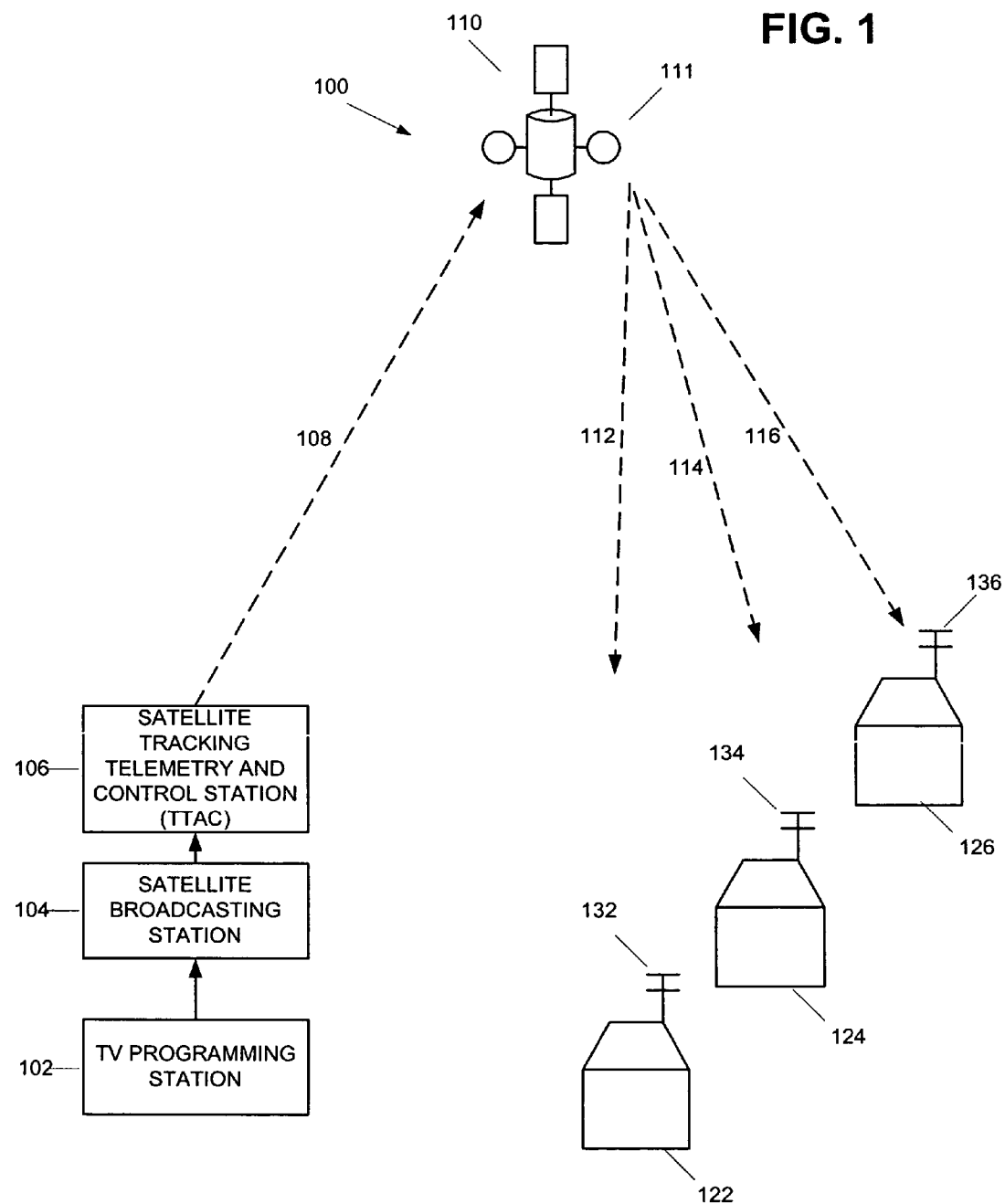
FIG. 1 is an exemplary illustration of satellite broadcasting system broadcasting satellite signals to a number of consumer terminals.

FIG. 1 is an exemplary illustration of satellite broadcasting system 100 which broadcasts satellite signals over an area having a number of consumer terminals. As illustrated in FIG. 1, a television (TV) programming station 102 generates or compiles TV programs to be transmitted to consumers subscribing to its services. The TV programming station 102 communicates such programs, which may be digital, analog or a combination thereof, to a satellite broadcasting station 104. In an alternate example, a number of different TV programming stations may communicate TV programs to the satellite broadcasting station 104. The satellite broadcasting station 104 converts the programs received from the TV programming station 102 into signals that can be transmitted to a satellite, and sends these signals to a satellite tracking telemetry and control (TTAC) station 106. The TTAC station 106 transmits these program signals 108 to a satellite 110. The satellite 110 can be any of the commonly used satellites in a satellite broadcasting system, such as a geostationary satellite, etc. The satellite 110 includes a transmitter 111 adapted to broadcast a satellite signal over a geographical area. The satellite 110 receives the program signals 108 from the TTAC 106, converts them into satellite signals that can be transmitted over a geographical area and, using the transmitter 111, transmits the converted or amplified satellite signals 112, 114 and 116 over a geographic area. While only three satellite signals 112, 114 and 116 are shown in this example, any number of satellite signals can be transmitted. The satellite signals 112, 114 and 116 are received at consumers 122, 124 and 126 by receivers 132, 134 and 136. While only three consumers 122, 124 and 126 having receivers 132, 134 and 136 are shown in this example, any number of consumers with any number of receivers can be provided. In the exemplary satellite broadcasting system 100 shown in FIG. 1, only one satellite 110 is responsible for transmitting satellite signals 112, 114 and 116 over a given geographic area covering consumers 122, 124 and 126. However, in an alternate embodiment, more than one satellite may be responsible for transmitting satellite signals over a given geographic area. For example, a second satellite may be used as backup to the first satellite 110, or more than one satellite may be responsible for transmitting program signals over a given area in a time sharing mode.

Figure 2:
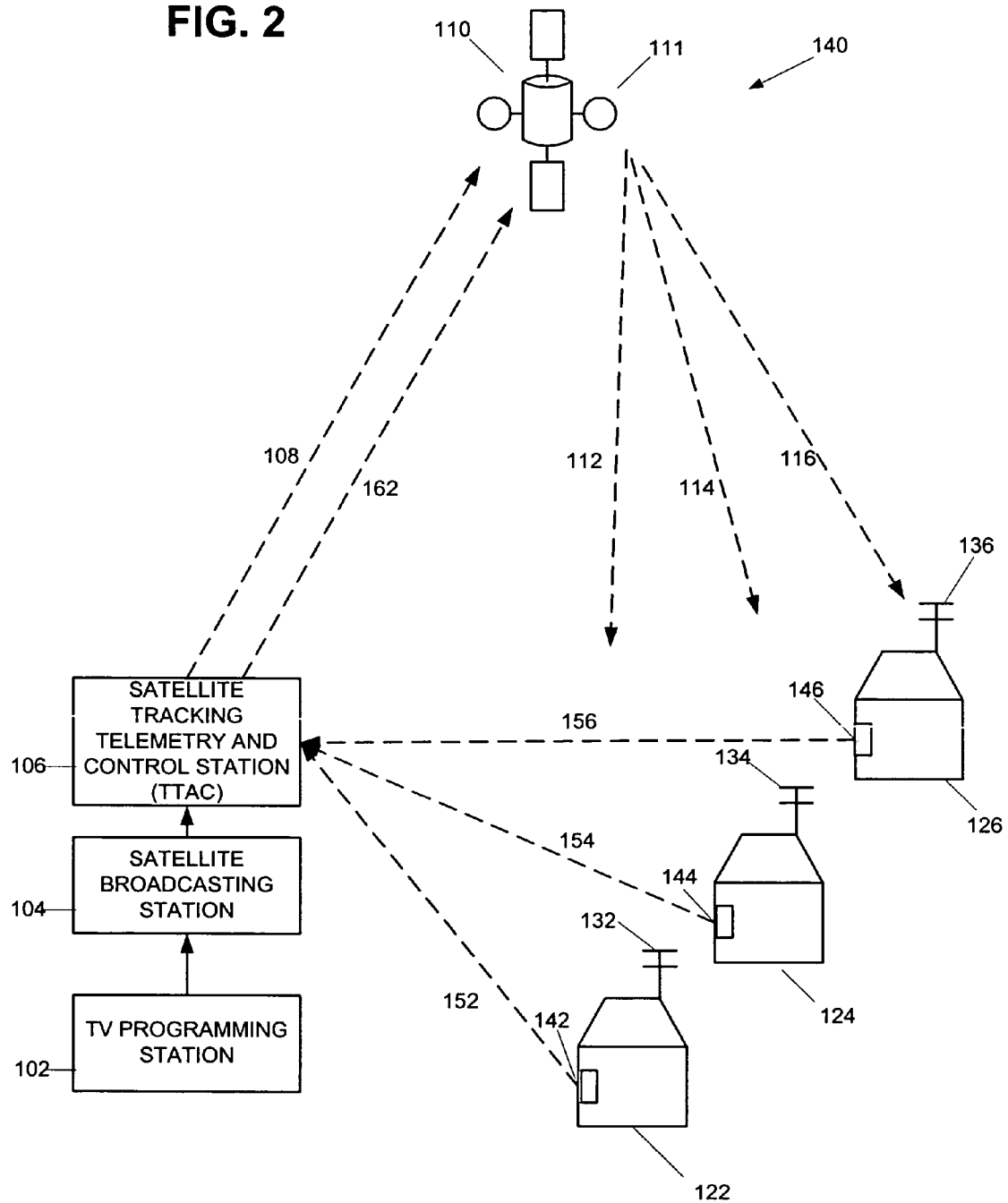
FIG. 2 is an exemplary illustration of a satellite broadcasting system using feedback from a number of consumer terminals.

FIG. 2 is an exemplary illustration of a satellite broadcasting system 140 similar to that of FIG. 1, but using feedback from a number of consumer terminals to control signal transmission. The embodiment of FIG. 2 is similar to the embodiment illustrated in FIG. 1 and includes many of the same structures and components which are illustrated with like reference numbers as those of FIG. 1. Referring to the embodiment of FIG. 2, consumers 122, 124 and 126 are provided with user terminals 142, 144 and 146, which are adapted to receive satellite signals 112, 114 and 116 from receivers 132, 134 and 136. The user terminals 142, 144 and 146 are also adapted to measure the signal strengths of the satellite signals 112, 114 and 116 and to generate second signals 152, 154 and 156 corresponding to the signal strengths of the satellite signals 112, 114 and 116. Although in the embodiment of the satellite control system 140 illustrated in FIG. 2, user terminals 142, 144 and 146 are shown separate from receivers 132, 134 and 136, it will be understood by one of ordinary skill in the art that the receivers 132, 134 and 136 and the user terminals 142, 144 and 146 can be combined together in a single unit or processor. The user terminals 142, 144 and 146 are further adapted to transmit second signals 152, 154 and 156. As illustrated in FIG. 2, the user terminals 142, 144 and 146 transmit the second signals 152, 154 and 156 to the satellite control station 106. Such transmission of the second signals 152, 154 and 156 may be accomplished using the plain old telephone service (POTS) system available to users 122, 124 and 126. Alternatively, such transmission of the second signals 152, 154 and 156 may be accomplished using any of the alternate methods available, such as wireless communication, digital subscriber line (DSL) communication, the internet, etc.

The TTAC station 106 of the embodiment shown in FIG. 2 is further adapted to receive and process the second signals 152, 154 and 156 and to generate a corrective signal 162 that is transmitted to the satellite 110. An exemplary block diagram of the processing of the second signals 152, 154 and 156 by the TTAC station 106 is further explained in more detail in FIG. 4. Based on the corrective signal 162, the satellite 110 takes a corrective action so that the satellite signals 112, 114 and 116 received by receivers 132, 134 and 136 are above a predetermined or minimum threshold provided for adequate reception at the user terminals 142, 144 and 146. Such a predetermined threshold can be provided to the satellite 110 in the form of the minimum signal strength required at a receivers 132, 134 and 136 for proper reception of information from the satellite signals 112, 114 and 116.

Figure 3:
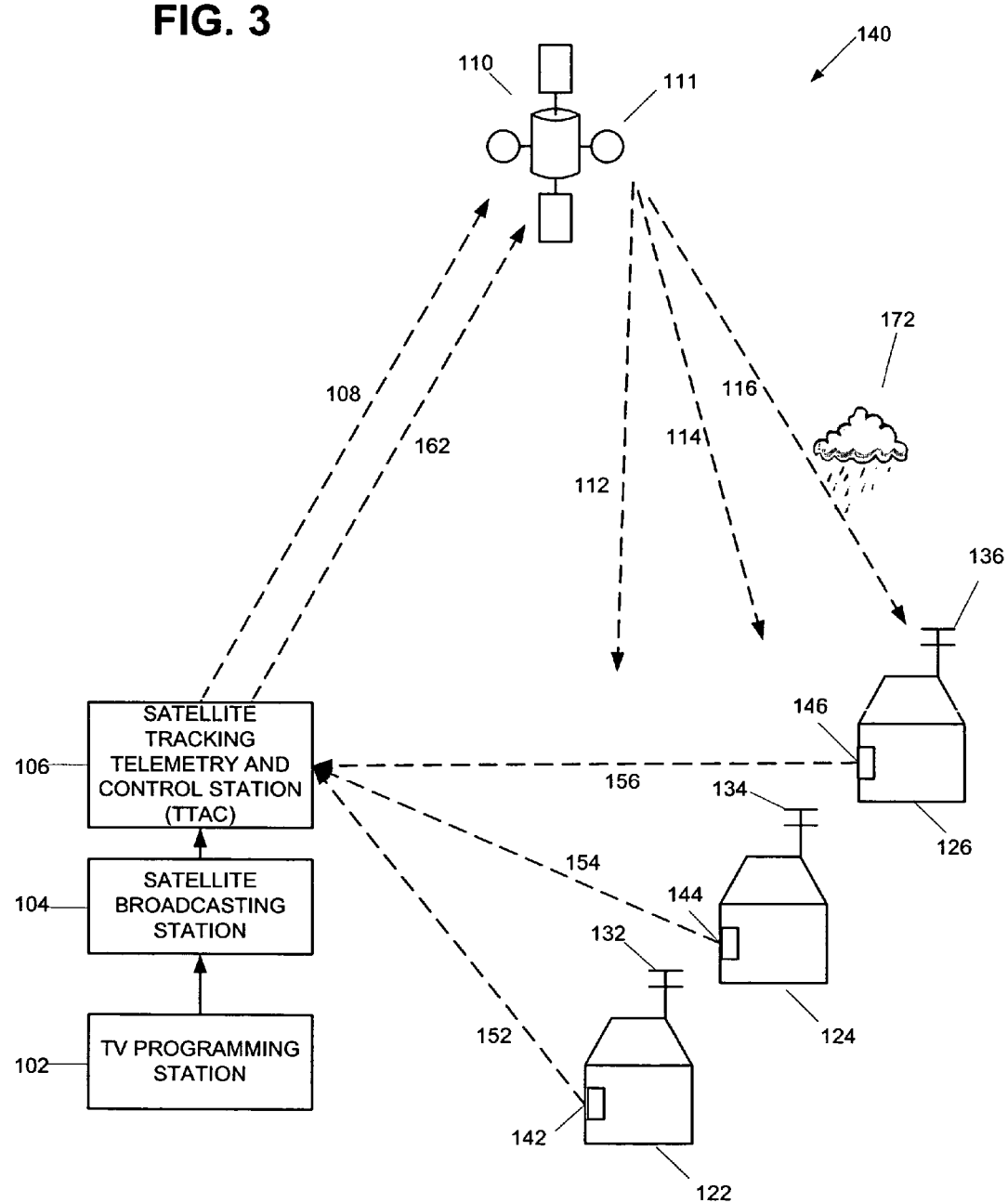
FIG. 3 is an exemplary illustration of the functioning of a satellite broadcasting system using feedback from a number of consumer terminals.

FIG. 3 illustrates the functioning of the satellite control system 100 of FIG. 2 in the presence of a weather front or a storm active in at least part of the area covered by the satellite 110. As illustrated in FIG. 3, the satellite signal 116 is affected by the presence of a storm 172. One way in which the satellite signal 116 might be affected by the storm 172 may be, for example, a reduction of the strength of the satellite signal 116 received by the receiver 136. In such a situation, the user terminal 146 detects the lower strength of the satellite signal 116 and transmits the second signal 156 to indicate the lower signal strength of the satellite signal 116 to the TTAC station 106. The TTAC station 106 processes the second signal 156 along with second signals 152 and 154 to generate a corrective signal 162 that is transmitted to the satellite 110. In this situation the corrective signal 162 may direct the satellite 110 to increase the strength of the satellite signal 116.

After the storm 172 illustrated in FIG. 3 moves away from the area covered by the satellite 110, the user terminal 146 may detect the satellite signal 116 to be of a strength higher than necessary. In such a situation, the second signal 156 transmitted by the user terminal 146 indicates such a higher strength of the satellite signal 116 to the TTAC station 106. The TTAC station 106 processes the second signal 156 along with second signals 152 and 154 to generate a new corrective signal 162 that is transmitted to the satellite 110. In such a situation the corrective signal 162 may direct the satellite 110 to decrease the strength of the satellite signal 116.

The satellite 110 of FIG. 3 is further adapted to receive the corrective signal 162 and, in response to the corrective signal 162, take one or more corrective actions. Such corrective actions may include, for example, increasing the power of a transmitter in satellite 110 responsible for generating satellite signal 116. Another example of such a corrective action may be activation of one or more back up transmitters on the satellite 110 to increase the strength of the satellite signal 116, or to adjust the rotational axis of the satellite 110 so as to increase the strength of the satellite signal 116. Other examples of such a corrective actions may be adjusting the gain setting of a transponder in satellite 110, adjusting the directional setting of the satellite 110, adjusting the downlink antenna gain pattern of the satellite 110, etc. Although, in the embodiment of FIG. 3, the decision to take the corrective action in response to the corrective signal 162 is taken by the satellite 110, the decision regarding what corrective action to take in response to the corrective signal 162 may also be made by the TTAC station 106.

The use of consumer terminals 142, 144 and 146 to detect the strengths of satellite signals 112, 114 and 116 as illustrated in FIG. 3 eliminates the need to place expensive monitoring stations throughout an area covered by a satellite broadcasting system to detect the existence of weather patterns such as the storm 172 shown in FIG. 3. The system illustrated in FIG. 3 also provides substantial reduction in overall system cost compared to a satellite control system that uses a number of ground based radar stations to detect weather patterns. Additionally, given the widespread distribution of consumer terminals in any satellite broadcasting area, greater monitoring coverage is achieved using the system illustrated in FIG. 3 than the coverage achieved by using a limited number of ground based radar stations.

Figure 4:
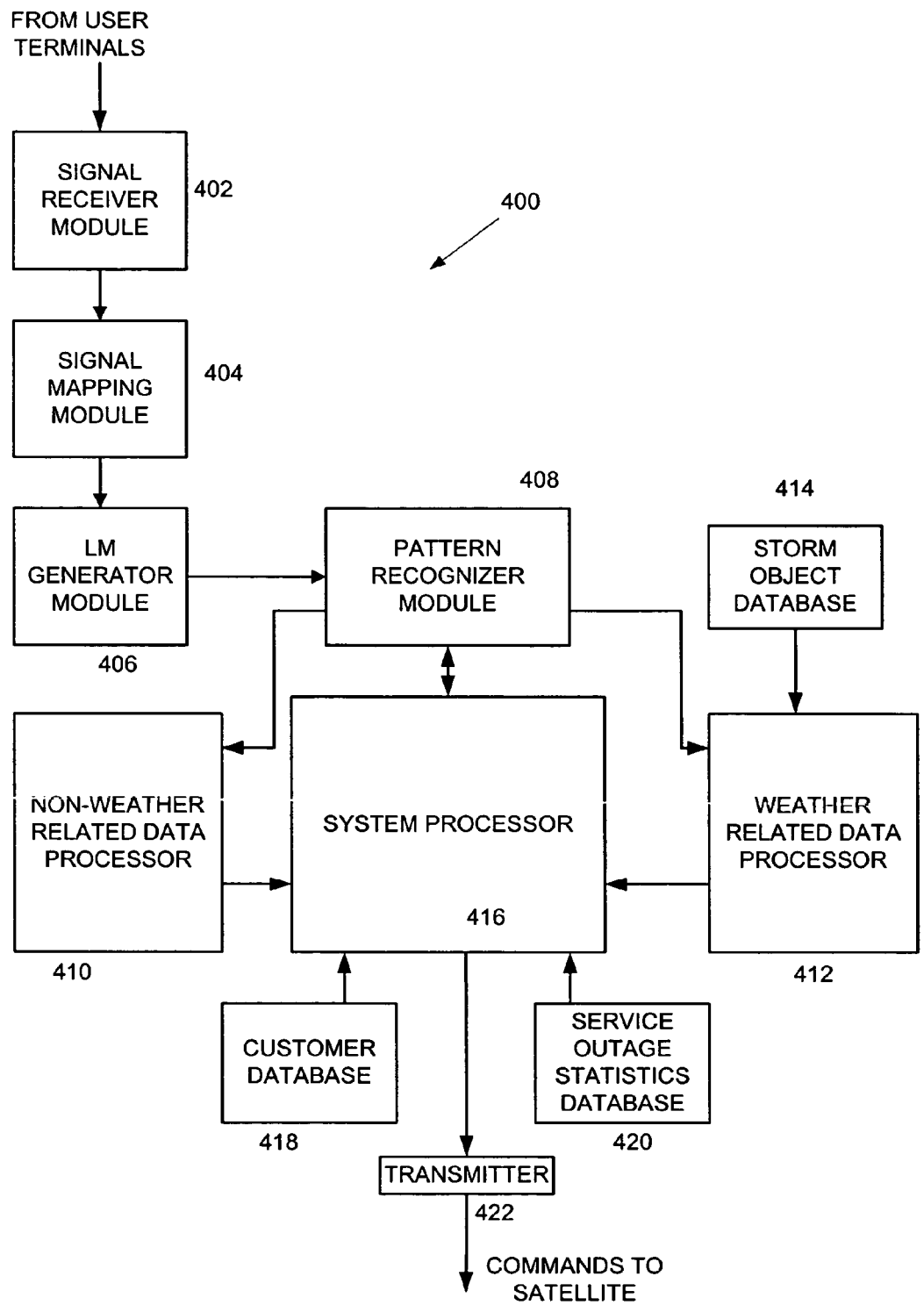
FIG. 4 is an exemplary block diagram of a satellite controlling system using feedback from a number of consumer terminals.

FIG. 4 is an exemplary block diagram of a processing apparatus 400 which may be used by the TTAC station 106 of FIG. 3 to develop a corrective signal in the satellite control system 140 of FIG. 3. The processing apparatus 400 includes a signal receiver module 402 that receives a number of second signals 152, 154 and 156 generated by user terminals 142, 144 and 146 in FIG. 3. The signal receiver module 402 communicates the collected signals 152, 154 and 156 to a signal mapping module 404 which maps the signal received from the signal receiver module 402 to a latitude/longitude grid. Such a latitude/longitude grid provides a three dimensional view of the signal strengths of the satellite signals 112, 114 and 116 available at various points in the service area covered by the satellite 110. The latitude/longitude grid generated by the signal mapping module 404 is communicated to a link margin (LM) generator module 406. The LM generator module 406 converts the signal strength data for each point related to a combination of latitude and longitude to a corresponding LM for that point. The LM generator module 406 communicates the information about the LMs to a pattern recognizer module 408.

The pattern recognizer module 408 applies any desired pattern recognition algorithm to the LMs at various points in the latitude/longitude grid to identify positional and temporal satellite signal degradation characteristics in the area covered by the satellite 110. The pattern recognizer module 408 converts the latitude/longitude grid to a matrix which can be manipulated by various predictive mathematical algorithms such as a least square error (LSE) algorithm, etc. Such a matrix can also be compared to one or more past matrices stored by the pattern recognizer 408 to generate one or more difference matrices. A matrix representing past LM values can be formed in any one of a number of ways, such as, by taking an average of a sliding window of past values, by taking an average of past values in which the more recent values are weighted more heavily, etc. A difference matrix indicates which areas within a region of interest are experiencing changes in the LM values and the magnitude of such changes. By processing the magnitudes of such changes in LMs, one or more weather patterns, such as storms, over a coverage area are identified. An example of a change in LM values indicating a weather pattern is, for example, a reduction in LM values that appears to be progressing over a coverage area over time to indicate a weather storm and its movement across the coverage area. Another example is a sudden reduction in the LM values in a section of the coverage area representing development of a new storm system. The size of the area showing such reduction in LM values and the magnitude of the reduction in LM values indicate the size and severity of such a storm system. The pattern recognizer 408 may capture various latitude/longitude grids to identify positional and temporal satellite signal degradation characteristics at a certain pre-determined interval of times which may be determined by an operator of the TTAC station 106.

A series of positional and temporal signal degradation characteristics identified by the pattern recognizer 408 is communicated to a non-weather related data processor 410 and a weather related data processor 412. The non-weather related data processor 410 stores the series of positional and temporal signal degradation characteristics in a local database available to the non-weather related data processor 410 to identify various non-weather related patterns. For example, a non-weather related pattern could be due to a satellite related signal degradation of an uplink related signal degradation. The weather related data processor 412 processes the series of positional and temporal signal degradation characteristics to identify various weather related patterns. For example, such weather related patterns could be due to a storm front, etc. The weather related data processor 412 stores the patterns related to storm fronts in a storm object database 414. Using the positional and temporal degradation characteristics generated by the pattern recognizer 408 and the weather related information stored in the storm object database 414, the weather related data processor 412 predicts storm movements within the area covered by satellite 110.

The pattern recognizer 408, the non-weather related data processor 410, and the weather related data processor 412 communicates with a system processor 416. Using the information from the pattern recognizer module 408, the non-weather related data processor 410, and the weather related data processor 412, the system processor 416 determines a corrective action for the satellite 110. The system processor 416 also receives information from a customer database 418 and a service outage statistics database 420, which may be used in determining the corrective action. In determining such a corrective action, the system processor 416 may use a set of predetermined criteria that may be provided to the system processor 416 by the operator of the TTAC station 106. For example, when it is determined that the signal degradation is related to an uplink, the corrective action may include switching to a backup uplink path. Alternatively, if the signal degradation is determined to be satellite related, the corrective action may include switching to a backup transponder of satellite 110, adjusting transponder gain settings, adjusting directional settings of the satellite 110, or changing the downlink antenna gain pattern of satellite 110. The system processor 416 may communicate such a corrective action to the satellite 110 using a transmitter 422 which may be communicatively connected to the system processor 416.

Figure 5:
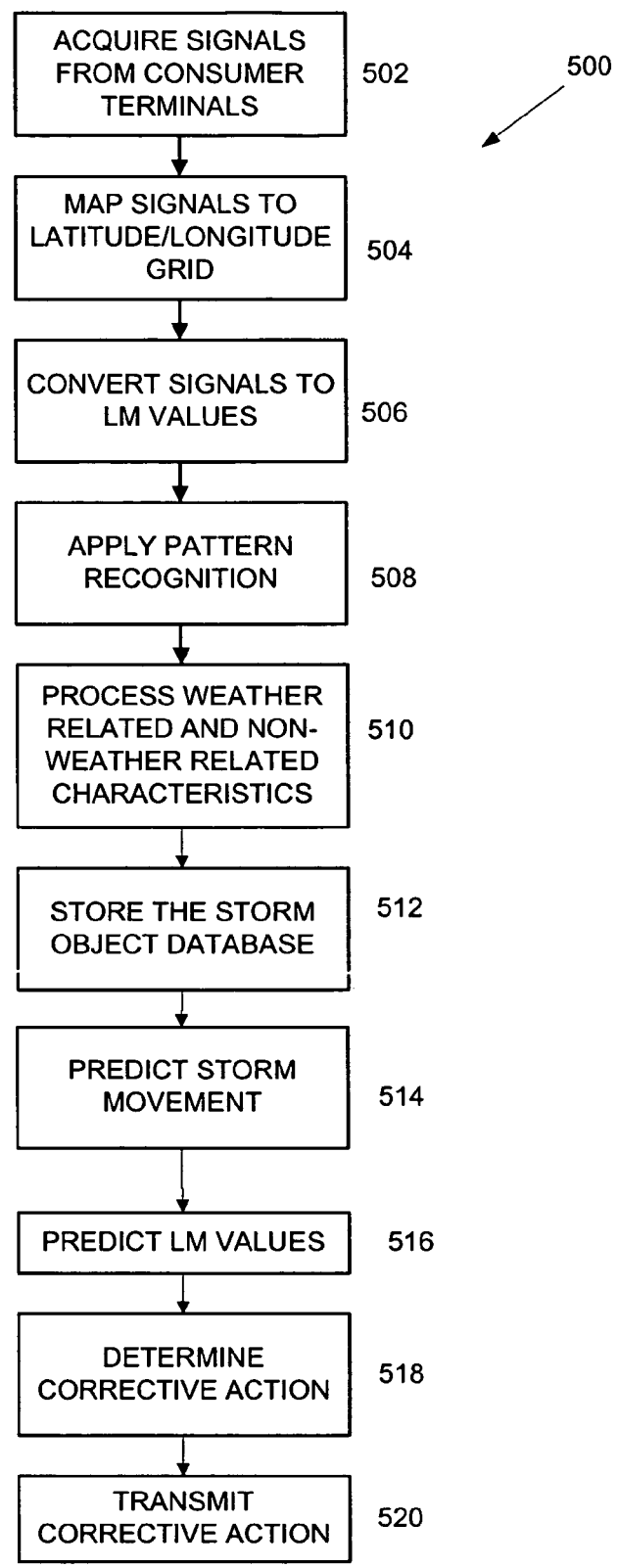
FIG. 5 is an exemplary flowchart of a process to develop a corrective signal using the feedback signals received from a number of consumer terminals.

FIG. 5 is an exemplary flowchart of a process 500 used by the processing apparatus 400 of FIG. 4 to develop a corrective signal in the satellite control system 140 of FIG. 2. At a step 502, the signal receiver module 402 of FIG. 4 acquires one or more of the second signals 152, 154 and 156 from the consumer terminals 142, 144 and 146. At a step 504, the signal mapping module 404 of FIG. 4 maps all or some of the second signals 152, 154 and 156 to a latitude/longitude grid. At a step 506, the LM generator module 406 of FIG. 4 converts the latitude/longitude grid created in the step 504 into LM values for various points on the grid. At a step 508, the pattern recognizer module 408 of FIG. 4 applies any desired pattern recognition algorithm to the matrix of LM values at various points on the latitude/longitude grid to recognize or detect signal degradation levels. At a step 510, the non-weather related data processor 410 of FIG. 4 processes the patterns recognized at the step 508 to identify and store non-weather related characteristics, and the weather related data processor 412 of FIG. 4 processes the patterns recognized at the step 508 to identify and store weather related characteristics. At a step 512, the weather related data processor 412 of FIG. 4 processes the weather related characteristics identified in the step 512 to identify and store storm related data in the storm database 414 of FIG. 4. At a step 514 the system processor 416 of FIG. 4 analyzes the data collected from the pattern recognizer 408, the non-weather related data processor 410, and the weather related data processor 412, to predict future storm movements. At a step 516, the system processor 416 of FIG. 4 predicts future LM values for various points on the latitude/longitude grid. At a step 518, the system processor 416 of FIG. 4 processes the LM values predicted in the step 516 to determine a corrective action for the satellite 110. At a step 520, the TTAC station 106 transmits a signal corresponding to the corrective action calculated in the step 516 to the satellite 110 using the transmitter 422 of FIG. 4.

Figure 6:
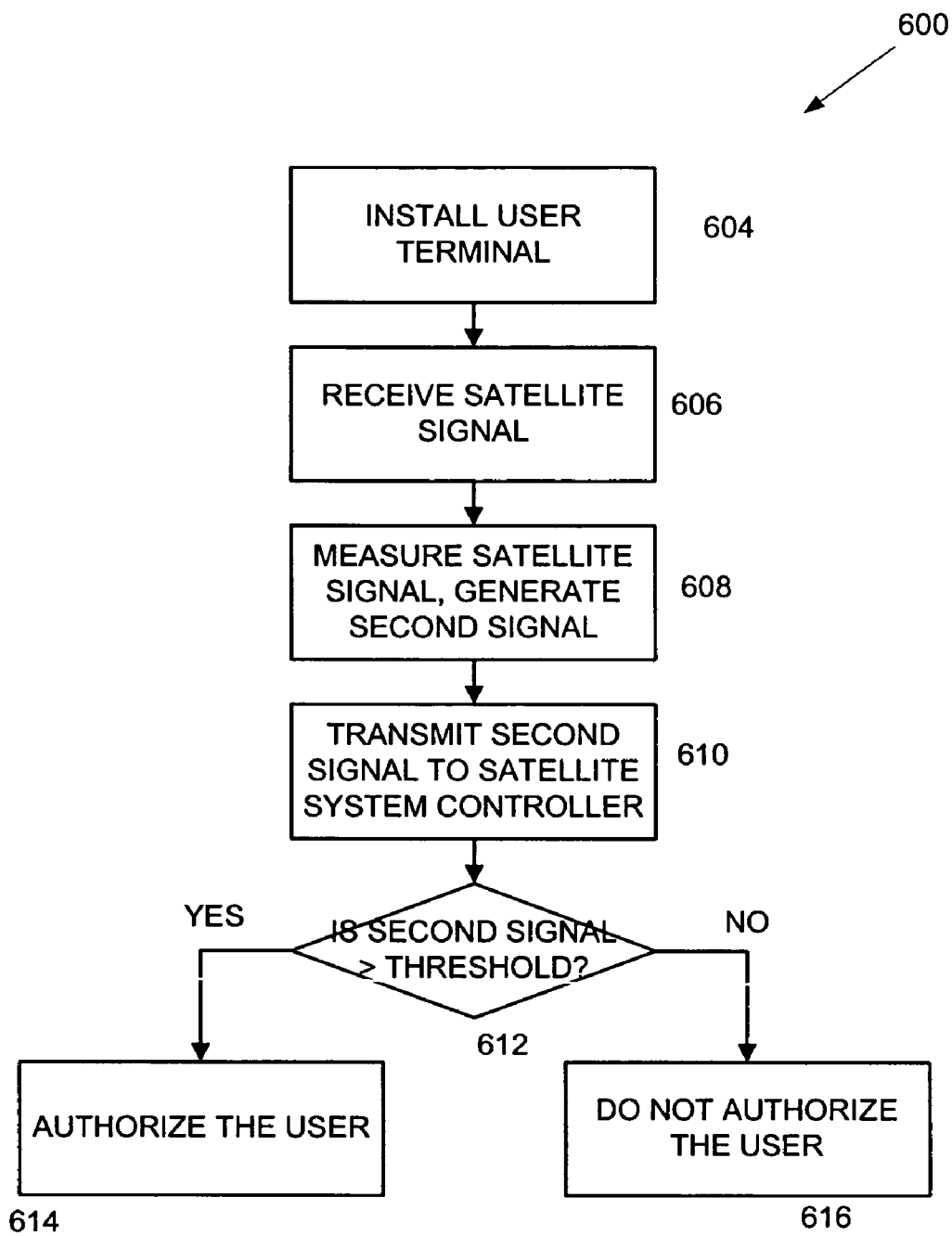
FIG. 6 is an exemplary block diagram of a satellite controlling system used to ensure proper installation of an outdoor unit (ODU) for a consumer.

FIG. 6 is an exemplary flowchart 600 of a satellite controlling system used to authorize the user 122 to begin receiving the satellite signal 112 of FIG. 2. At a step 604, a representative of a company providing satellite services installs the user terminal 142 and the receiver 132 for the user 122. The user terminal 142 and the receiver 132 may be combined into a unit called the outdoor unit (ODU). At a step 606, the receiver 132 is activated to receive the satellite signal 112 from the satellite 110. At a step 608, the user terminal 142, measures the signal strength of the satellite signal 112 to generate a second signal 152. At a step 610, the user terminal 142 transmits the second signal 152 to the TTAC controller 106 of FIG. 3. The TTAC controller 106 then compares the second signal 152 to a predetermined threshold at a step 612 to determine whether the user 122 should be authorized to receive the satellite signal 112. If the second signal 152 is found to be above or equal to the predetermined threshold, the TTAC controller 106 transmits a signal to the satellite 110 at a step 614 using the transmitter 422 of FIG. 4, instructing the satellite 110 to transmit an authorizing signal to the receiver 132. On the other hand, if the second signal 152 is found to be below the predetermined threshold, the TTAC controller 106 transmits a signal to the satellite 110 at a step 616 using the transmitter 422 of FIG. 4, instructing the satellite 110 to transmit a signal to the receiver 132 to notify the user 122 that he or she is not authorized to receive the satellite signal 112.

Many modifications and variations may be made in the techniques and structures described and illustrated herein without departing from the spirit and scope of the present invention. Accordingly, it should be understood that the methods and apparatus described herein are illustrative only and are not limiting upon the scope of the present patent.

What is claimed is:

1. A method of controlling a satellite comprising:
   broadcasting a satellite signal;
   receiving the satellite signal at a number of user terminals;
   detecting the signal strength of the satellite signal at each of the user terminals;
   transmitting a second signal from each of the number of user terminals to a satellite control station, the second signal corresponding to the signal strength of the satellite signal received at each of the number of user terminals; and
   adjusting an operative characteristic of the satellite in response to one or more of the second signals, comprising the steps of:
      acquiring the second signals from each of the number of user terminals;
      mapping each of the second signals to a grid;
      converting the second signals to link margin values on the grid;
      applying a pattern recognition to the link margin values on the grid to detect signal degradation values;
      predicting weather;
      predicting link margin values on the grid from the signal degradation values and the predicted weather; and
      adjusting the operative characteristic of the satellite using the predicted future link margin values.

2. The method of claim 1 wherein at least one of the second signals is transmitted using a telephone communication network.

3. The method of claim 1 wherein the operative characteristic of the satellite adjusted in response to one or more of the second signals is whether or not to use a backup transponder.

4. The method of claim 1 wherein the operative characteristic of the satellite adjusted in response to one or more of the second signals is a transponder gain setting.

5. The method of claim 1 wherein the operative characteristic of the satellite adjusted in response to one or more of the second signals is a directional setting of the satellite.

6. The method of claim 1 wherein the operative characteristic of the satellite adjusted in response to one or more of the second signals is a downlink antenna gain pattern.

7. The method of claim 1 further including analyzing one or more of the second signals to predict a storm movement.

8. The method of claim 1 further including authorizing one of the user terminals to begin receiving a satellite service in response to the second signal transmitted by the one of the user terminals.

9. A satellite control system comprising:
   a satellite having a transmitter adapted to broadcast a satellite signal;
   a number of user terminals each having a receiver adapted to receive the satellite signal, and a transmitter adapted to transmit a second signal corresponding to the signal strength of the satellite signal received by the receiver to a satellite control station; and
   a satellite control station having a receiver adapted to receive the second signals and a controller adapted to adjust an operative characteristic of the satellite in response to one or more of the second signals wherein the controller comprises:
   means for mapping each of the second signals to a grid;
   means for converting the second signals to link margin values on the grid;
   means for applying a pattern recognition to the link margin values on the grid to detect signal degradation values;
   means for predicting weather;
   means for predicting link margin values on the grid from the signal degradation values and the predicted weather; and
   means for adjusting the operative characteristic of the satellite using the predicted link margin values.

10. The satellite control system of claim 9 wherein at least one of the user terminals is further adapted to transmit the second signal using a telephone communication network.

11. The satellite control system of claim 9 wherein the operative characteristic of the satellite adjusted in response to one or more of the second signals is whether to use a backup transponder.

12. The satellite control system of claim 9 wherein the operative characteristic of the satellite adjusted in response to one or more of the second signals is a transponder gain setting.

13. The satellite control system of claim 9 wherein the operative characteristic of the satellite adjusted in response to one or more of the second signals is a directional setting of the satellite.

14. The satellite control system of claim 9 wherein the operative characteristic of the satellite adjusted in response to one or more of the second signals is a downlink antenna gain pattern.

15. The satellite control system of claim 9 wherein the satellite control station is further adapted to analyze one or more of the second signals to predict a storm movement.

16. The satellite control system of claim 9 wherein the satellite control station is further adapted to authorize one of the user terminals to begin receiving a satellite service in response to the second signal transmitted by the one of the user terminals.

* * * * *